United States Patent
Qi et al.

(10) Patent No.: US 10,331,494 B2
(45) Date of Patent: Jun. 25, 2019

(54) BALANCING THE LOADINGS OF ACCELERATORS

(71) Applicant: Shanghai Zhaoxin Semiconductor Co., Ltd., Shanghai (CN)

(72) Inventors: Zongpu Qi, Beijing (CN); Xuehua Han, Beijing (CN); Di Hu, Beijing (CN); Zheng Wang, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 102 days.

(21) Appl. No.: 15/797,565

(22) Filed: Oct. 30, 2017

(65) Prior Publication Data

US 2019/0042327 A1    Feb. 7, 2019

(30) Foreign Application Priority Data

Aug. 7, 2017  (CN) .......................... 2017 1 0666890

(51) Int. Cl.
| | |
|---|---|
| *G06F 9/46* | (2006.01) |
| *G06F 9/50* | (2006.01) |
| *G06F 1/08* | (2006.01) |
| *G06F 13/40* | (2006.01) |
| *G06F 13/36* | (2006.01) |

(52) U.S. Cl.
CPC .............. *G06F 9/5083* (2013.01); *G06F 1/08* (2013.01); *G06F 9/5072* (2013.01); *G06F 13/4022* (2013.01); *G06F 13/36* (2013.01)

(58) Field of Classification Search
CPC .... G06F 9/5072; G06F 13/36; G06F 13/4022; G06F 9/5083; G06F 1/08; H04L 47/125
See application file for complete search history.

(56) References Cited

U.S. PATENT DOCUMENTS

| | | | |
|---|---|---|---|
| 10,078,613 B1* | 9/2018 | Ramey | ................ G06F 13/4022 |
| 2009/0216910 A1* | 8/2009 | Duchesneau | ......... G06F 9/5072 |
| | | | 709/250 |
| 2014/0052965 A1 | 2/2014 | Sarel | |
| 2015/0236959 A1* | 8/2015 | Cai | ...................... H04L 47/125 |
| | | | 709/235 |
| 2017/0220499 A1* | 8/2017 | Gray | ...................... G06F 13/36 |

FOREIGN PATENT DOCUMENTS

CN           104106053 A       10/2014

* cited by examiner

*Primary Examiner* — Tuan A Vu
(74) *Attorney, Agent, or Firm* — McClure, Qualey & Rodack, LLP (57) ABSTRACT

A balancing device, which is configured to balance a first duty cycle of a first accelerator and a second duty cycle of a second accelerator, includes a loading monitor and a loading balancer. The loading monitor is configured to monitor a first busy period of the first accelerator and a second busy period of the second accelerator. The loading balancer calculates the first duty cycle and the second duty cycle according to the first busy period and the second busy period, and moves at least one command queue of the first accelerator and the second accelerator according to the first duty cycle and the second duty cycle, such that the first duty cycle is close to the second duty cycle.

20 Claims, 5 Drawing Sheets

BALANCING THE LOADINGS OF ACCELERATORS

CROSS REFERENCE TO RELATED APPLICATIONS

This Application claims priority of China Patent Application No. 201710666890.3, filed on Aug. 7, 2017, the entirety of which is incorporated by reference herein.

BACKGROUND OF THE INVENTION

Field of the Invention

The disclosure relates generally to balancing devices for balancing loadings on a plurality of accelerators and methods thereof.

Description of the Related Art

Hardware accelerators, for example, the accelerator function units (AFU), are primarily configured to accelerate some specific calculation tasks, in which the specific tasks calculated by the CPU may lead to lower efficiency. Through a process of analysis, an accelerator is designed to execute calculation tasks for improving efficiency. In an operating system platform for multiple users and multiple tasks to be executed in parallel, there is a demand for an acceleration of the process of multiple applications or multi-execution streams.

In order for multiple applications or multi-execution streams to be able to share accelerators, several accelerators with identical functions are usually placed in the same chip. However, if the accelerators are not well dispatched, the loads on the accelerators are unbalanced and the ability of the accelerators may not be brought into full play. Therefore, there is a need to balance the loadings on several accelerators to bring the function of these accelerators into full play.

BRIEF SUMMARY OF THE INVENTION

In an embodiment, a balancing device which is configured to balance a first duty cycle of a first accelerator and a second duty cycle of a second accelerator comprises a loading monitor and a loading balancer. The loading monitor is configured to monitor a first busy period of the first accelerator and a second busy period of the second accelerator. The loading balancer calculates the first duty cycle and the second duty cycle according to the first busy period and the second busy period, and moves at least one command queue of the first accelerator and/or the second accelerator according to the first duty cycle and the second duty cycle to make the first duty cycle and the second duty cycle close to each other.

According to an embodiment of the invention, the first accelerator is configured to execute a first command queue and a second command queue, and the second accelerator is configured to execute a third command queue and a fourth command queue. The loading monitor comprises a clock counter, a first switch, a first busy counter, a first execution counter, a second switch, a second busy counter, and a second execution counter. The clock counter counts a predetermined period according to a clock. When a first busy bit is in a first logical state, the first switch provides the clock for a first execution clock. When the first accelerator is in a busy state, the first busy bit is in the first logical state. The first busy counter counts a first busy period of the first accelerator according to the first execution clock. The first execution counter counts a first execution period of the first command queue and a second execution period of the second command queue according to the first execution clock. When a second busy bit is in the first logical state, the second switch provides the clock for a second execution clock. When the second accelerator is in the busy state, the second busy bit is in the first logical state. The second busy counter counts a second busy period of the second accelerator according to the second execution clock. The second execution counter counts a third execution period of the third command queue and a fourth execution period of the fourth command queue according to the second execution clock.

According to an embodiment of the invention, the loading monitor further comprises a controller. The controller stores the first busy period, the second busy period, the first execution period, the second execution period, the third execution period, and the fourth execution period in a memory. When the clock counter has counted to the predetermined period, the controller resets the clock counter, the first busy counter, the first execution counter, the second busy counter, and the second execution counter to zero.

According to an embodiment of the invention, the first duty cycle is equal to the first busy period divided by the predetermined period, the second duty cycle is equal to the second busy period divided by the predetermined period, a first execution duty cycle is equal to the first execution period divided by the predetermined period, a second execution duty cycle is equal to the second execution period divided by the predetermined period, a third execution duty cycle is equal to the third execution period divided by the predetermined period, and a fourth execution duty cycle is equal to the fourth execution period divided by the predetermined period.

According to an embodiment of the invention, the first busy period is a time period when the first accelerator is in a busy state during a predetermined period, and the second busy period is a time period when the second accelerator is in the busy state during the predetermined period. The first duty cycle is equal to the first busy period divided by the predetermined period, and the second duty cycle is equal to the second busy period divided by the predetermined period.

According to an embodiment of the invention, the first accelerator is configured to execute a first command queue and a second command queue, and the second accelerator is configured to execute a third command queue and a fourth command queue. A first execution period is a time period when the first accelerator executes commands of the first command queue during a predetermined period, and a second execution period is a time period when the first accelerator executes commands of the second command queue during the predetermined period. A first execution duty cycle is equal to the first execution period divided by the predetermined period, and a second execution duty cycle is equal to the second execution period divided by the predetermined period.

According to an embodiment of the invention, when the loading balancer determines that the difference between the first duty cycle and the second duty cycle exceeds a threshold, the loading balancer moves the second command queue to the second accelerator. The second execution duty cycle does not exceed a half of the threshold with a range of error.

According to another embodiment of the invention, when the loading balancer determines that the difference between the first duty cycle and the second duty cycle exceeds a threshold, the loading balancer moves the second command queue to the second accelerator, in which the second execution duty cycle is less than the first execution duty cycle.

According to yet another embodiment of the invention, when the loading balancer determines that the difference between the first duty cycle and the second duty cycle exceeds a threshold, the loading balancer moves the first command queue or the second command queue to the second accelerator and moves the third command queue or the fourth command queue to the first accelerator.

According to an embodiment of the invention, the balancing device is coupled between a central processing unit and the first and second accelerators.

In an embodiment, a balancing method, which is configured to balance a first duty cycle of a first accelerator and a second duty cycle of a second accelerator, comprises: monitoring a first busy period of the first accelerator and a second busy period of the second accelerator; calculating the first duty cycle according to the first busy period; calculating the second duty cycle according to the second busy period; and moving at least one command queue of the first accelerator and/or the second accelerator according to the first duty cycle and the second duty cycle to make the first duty cycle and the second duty cycle close to each other.

According to an embodiment of the invention, the first accelerator is configured to execute a first command queue and a second command queue, and the second accelerator is configured to execute a third command queue and a fourth command queue. The step of monitoring the first busy period and the second busy period further comprises: counting a predetermined period according to a clock; when the first accelerator is in a busy state, providing the clock for a first execution clock; counting a first busy period of the first accelerator according to the first execution clock; counting a first execution period of the first command queue and a second execution period of the second command queue according to the first execution clock; when the second accelerator is in the busy state, providing the clock for a second execution clock; counting a second busy period of the second accelerator according to the second execution clock; and counting a third execution period of the third command queue and a fourth execution period of the fourth command queue according to the second execution clock.

According to an embodiment of the invention, the step of monitoring the first busy period and the second busy period further comprises: storing the first busy period, the second busy period, the first execution period, the second execution period, the third execution period, and the fourth execution period in a memory.

According to an embodiment of the invention, the first duty cycle is equal to the first busy period divided by the predetermined period, the second duty cycle is equal to the second busy period divided by the predetermined period, a first execution duty cycle is equal to the first execution period divided by the predetermined period, a second execution duty cycle is equal to the second execution period divided by the predetermined period, a third execution duty cycle is equal to the third execution period divided by the predetermined period, and a fourth execution duty cycle is equal to the fourth execution period divided by the predetermined period.

According to an embodiment of the invention, the first busy period is a time period when the first accelerator is in a busy state during a predetermined period, and the second busy period is a time period when the second accelerator is in the busy state during the predetermined period. The first duty cycle is equal to the first busy period divided by the predetermined period, and the second duty cycle is equal to the second busy period divided by the predetermined period.

According to an embodiment of the invention, the first accelerator is configured to execute a first command queue and a second command queue, and the second accelerator is configured to execute a third command queue and a fourth command queue. A first execution period is a time period when the first accelerator executes commands of the first command queue during a predetermined period, and a second execution period is a time period when the first accelerator executes commands of the second command queue during the predetermined period. A first execution duty cycle is equal to the first execution period divided by the predetermined period, and a second execution duty cycle is equal to the second execution period divided by the predetermined period.

According to an embodiment of the invention, the step of moving at least one command queue of the first accelerator and/or the second accelerator according to the first duty cycle and the second duty cycle further comprises: determining whether the difference between the first duty cycle and the second duty cycle exceeds a threshold; and when the difference exceeds the threshold, moving the second command queue to the second accelerator, wherein the second execution duty cycle does not exceed a half of the difference with a range of error.

According to another embodiment of the invention, the step of moving at least one command queue of the first accelerator and/or the second accelerator according to the first duty cycle and the second duty cycle further comprises: determining whether the difference between the first duty cycle and the second duty cycle exceeds a threshold; and when the difference exceeds the threshold, moving the second command queue to the second accelerator, wherein the second execution duty cycle is less than the first duty cycle.

According to yet another embodiment of the invention, the step of moving at least one command queue of the first accelerator and/or the second accelerator according to the first duty cycle and the second duty cycle further comprises: determining whether the difference between the first duty cycle and the second duty cycle exceeds a threshold; and when the difference exceeds the threshold, moving the first command queue or the second command queue to the second accelerator, and moving the third command queue or the fourth command queue to the first accelerator.

According to an embodiment of the invention, the step of moving at least one command queue of the first accelerator and/or the second accelerator according to the first duty cycle and the second duty cycle further comprises: determining whether a difference between the first duty cycle and the second duty cycle exceeds a threshold; and when the difference exceeds the threshold, executing the step of moving at least one command queue of the first accelerator and/or the second accelerator.

The invention balances the loadings on several accelerators to bring the function and ability of these accelerators to the fullest.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It should be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

Figure 1:
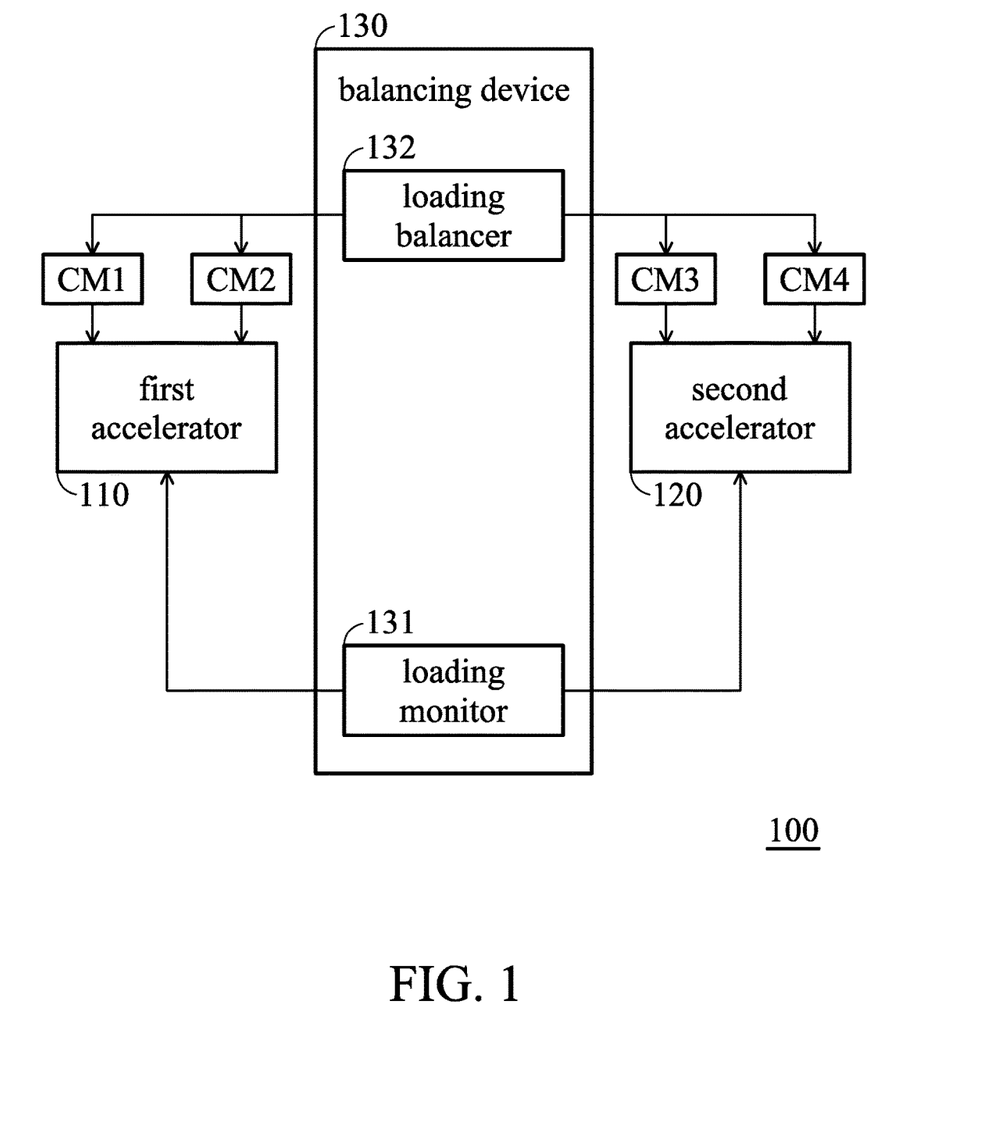
FIG. 1 is a block diagram of a balanced-accelerating device in accordance with an embodiment of the invention.

FIG. 1 is a block diagram of a balanced-accelerating device in accordance with an embodiment of the invention. As shown in FIG. 1, the balanced-accelerating device 100 includes a first accelerator 110, a second accelerator 120, and a balancing device 130. The first accelerator 110 executes a first command queue CM1 and a second command queue CM2 in a first busy period. The second accelerator 120 executes a third command queue CM3 and a fourth command queue CM4 in a second busy period.

In addition, the balancing device 130 includes a loading monitor 131 and a loading balancer 132. The loading monitor 131 is configured to monitor the first accelerator 110 executing the first command queue CM1 and the second command queue CM2 in the first busy period, the first execution period of the first command queue CM1, and the second execution period of the second command queue CM2. In addition, the loading monitor 131 is further configured to monitor the second accelerator 120 executing the third command queue CM3 and the fourth command queue CM4 in the second busy period, the third execution period of the third command queue CM3, and the fourth execution period of the fourth command queue CM4.

According to an embodiment of the invention, the balancing device 130 may include two loading monitors 131 which are respectively configured to monitor the first accelerator 110 and the second accelerator 120. The balancing device 130 including one loading monitor 131 is merely illustrated herein for explanation. It will be described in the following paragraphs that how the loading monitor 131 monitors the first busy period, the second busy period, the first execution period, the second execution period, the third execution period, and the fourth execution period.

The loading balancer 132 calculates a first duty cycle of the first accelerator 110 and a second duty cycle of the second accelerator 120 according to the first busy period and the second busy period. In addition, the loading balancer 132 moves the first command queue CM1 or the second command queue CM2 of the first accelerator 110 to the second accelerator 120, or moves the third command queue CM3 or the fourth command queue CM4 of the second accelerator 120 to the first accelerator 110, according to the first duty cycle and the second duty cycle.

The first accelerator 110, the second accelerator 120, the first accelerator 110 executing the first command queue CM1 and the second command queue CM2, and the second accelerator 120 executing the third command queue CM3 and the fourth command queue CM4 are merely illustrated herein. The balanced-accelerating device 100 may include any number of accelerators, and each accelerator may be configured to execute any number of command queues. The invention is not intended to be limited thereto.

Figure 2:
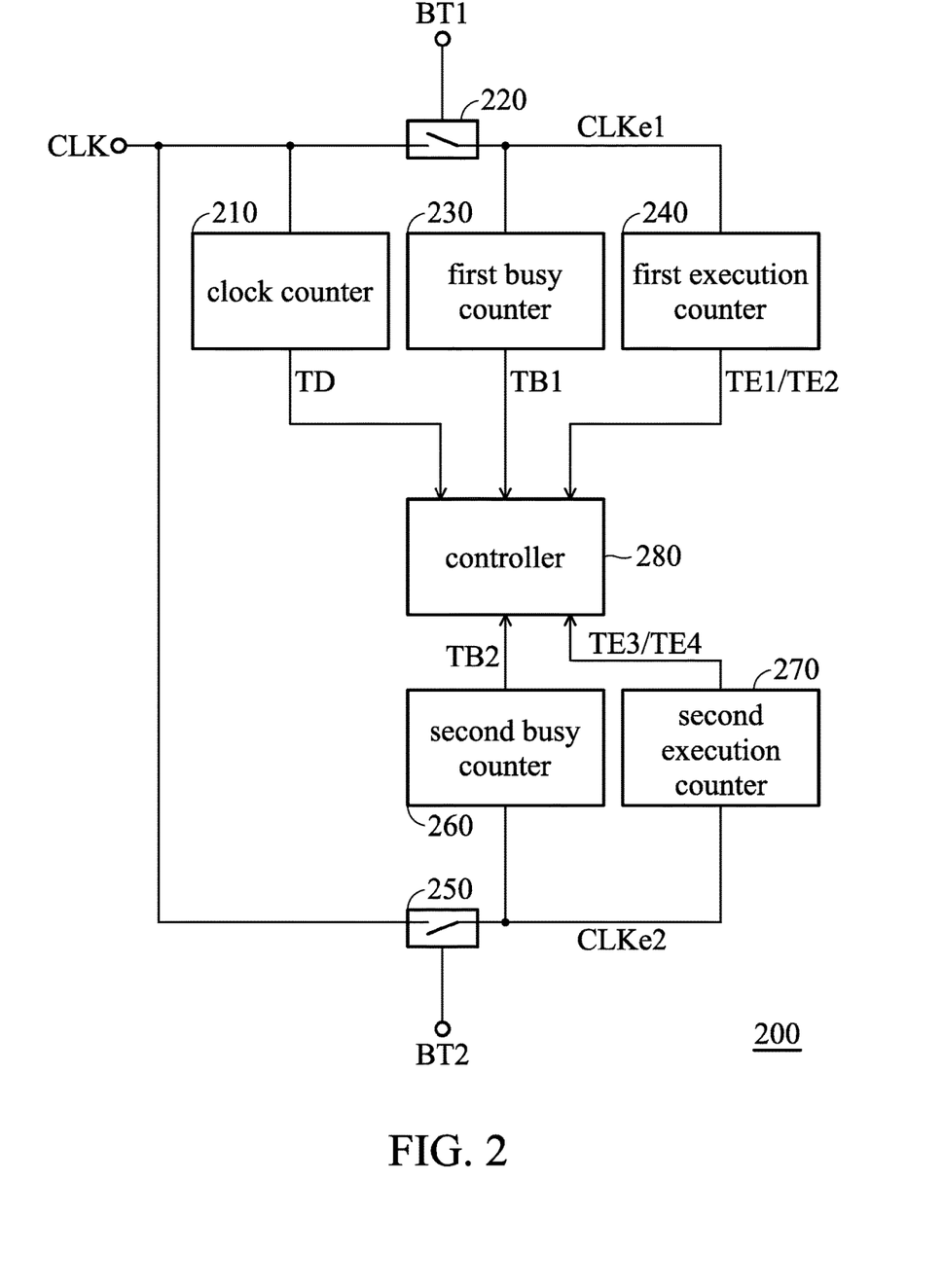
FIG. 2 is a block diagram of a loading monitor in accordance with an embodiment of the invention.

FIG. 2 is a block diagram of a loading monitor in accordance with an embodiment of the invention. As shown in FIG. 2, the loading monitor 200 includes a clock counter 210, a first switch 220, a first busy counter 230, a first execution counter 240, a second switch 250, a second busy counter 260, a second execution counter 270, and a controller 280, in which the loading monitor 200 in FIG. 2 corresponds to the loading monitor 131 in FIG. 1.

According to an embodiment of the invention, when the balancing device 130 in FIG. 1 includes two loading monitors 131 which are respectively configured to monitor the first accelerator 110 and the second accelerator 120, the loading monitor 200 includes the clock counter 210, the first switch 220, the first busy counter 230, the first execution counter 240, and the controller 280.

The clock counter 210 counts the predetermined period TD according to the clock CLK. When the first busy bit BT1 is in the first logical state, the first switch 220 is turned ON to provide the clock CLK for the first execution clock CLKe1; when the first busy bit BT1 is in the second logical state, the first switch 220 is not turned ON to not provide the clock CLK for the first execution clock CLKe1. According to an embodiment of the invention, when the first accelerator 110 in FIG. 1 is in the busy state, the first busy bit BT1 is in the first logical state; when the first accelerator 110 in FIG. 1 is in the stand-by state, the first busy bit BT1 is in the second logical state.

The first busy counter 230 counts the first busy period TB1 of the first accelerator 110 in FIG. 1 according to the first execution clock CLKe1. The first execution counter 240 counts the first execution period TE1 of the first command queue CM1 and the second execution period TE2 of the second command queue CM2 according to the first execution clock CLKe1. According to an embodiment of the invention, when the first accelerator 110 finishes the first command queue CM1, the controller 280 reads the first execution period TE1 and then resets the first execution counter 240, such that the first execution counter 240 is able to count the second execution period TE2.

When the second busy bit BT2 is in the first logical state, the second switch 250 provides the clock CLK for the second execution clock CLKe2; when the second busy bit BT2 is in the second logical state, the second switch 250 is not turned ON to not provide the clock CLK for the second execution clock CLKe2. According to an embodiment of the invention, when the second accelerator 120 in FIG. 1 is in the busy state, the second busy bit BT2 is in the first logical state; when the second accelerator 120 in FIG. 1 is in the stand-by state, the second busy bit BT2 is in the second logical state.

The second busy counter 260 counts the second busy period TB2 of the second accelerator 120 in FIG. 1 according to the second execution clock CLKe2. The second execution counter 270 counts the third execution period TE3 of the third command queue CM3 and the fourth execution period TE4 of the fourth command queue CM4 according to the second execution clock CLKe2. According to an embodiment of the invention, when the second accelerator 120 finishes the third command queue CM3, the controller 280 reads the third execution period TE3 and then resets the second execution counter 270, such that the second execution counter 270 is able to count the fourth execution period TE4.

According to an embodiment of the invention, when the first accelerator 110 finishes the first command queue CM1 or the second accelerator 120 finishes the third command queue CM3, the controller 280 stores the first execution period TE1 and the third execution period TE3 in the memory. According to an embodiment of the invention, when the clock counter 210 has counted to the predetermined period TD, the controller 280 stores the predetermined period TD, the first busy period TB1, and the second busy period TB2 in the memory and then resets the clock counter 210, the first busy counter 230, and the second busy counter 260 to zero.

According to an embodiment of the invention, the loading balancer 132 in FIG. 1 calculates the first duty cycle, the second duty cycle, the first execution duty cycle, the second execution duty cycle, the third execution duty cycle, and the fourth execution duty cycle according to the predetermined period TD, the first busy period TB1, the second busy period TB2, the first execution period TE1, the second execution period TE2, the third execution period TE3, and the fourth execution period TE4. The first duty cycle is equal to the first busy period TB1 divided by the predetermined period TD, the second duty cycle is equal to the second busy period TB2 divided by the predetermined period TD, the first execution duty cycle is equal to the first execution period TE1 divided by the predetermined period TD, the second execution duty cycle is equal to the second execution period TE2 divided by the predetermined period TD, the third execution duty cycle is equal to the third execution period TE3 divided by the predetermined period TD, and the fourth execution duty cycle is equal to the fourth execution period TE4 divided by the predetermined period TD.

For explaining the balancing method about how the balancing device 130 balances the duty cycles of a plurality of accelerators, the following description is based on some embodiments of the invention, but not intended to be limited thereto.

Figure 3:
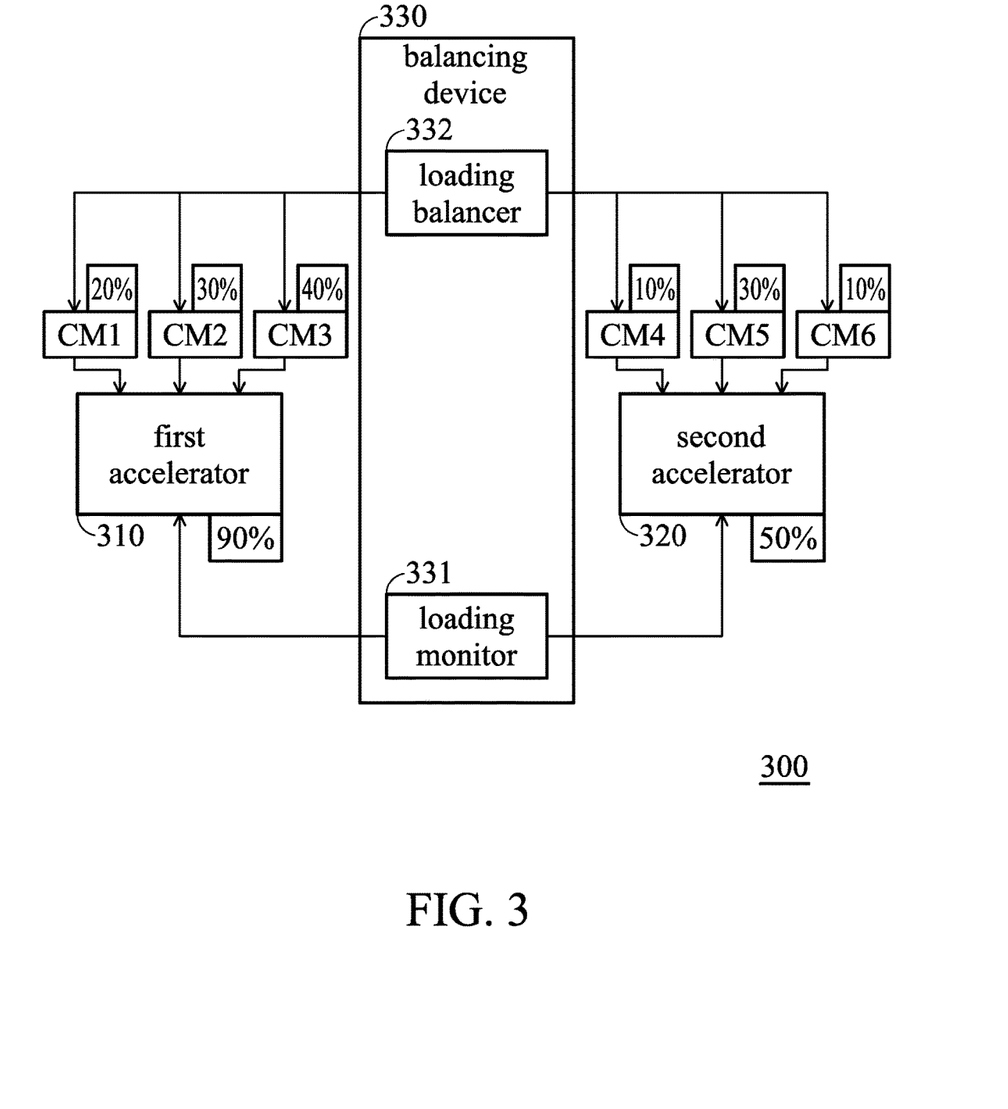
FIG. 3 is a schematic diagram of a balanced-accelerating device in accordance with an embodiment of the invention.

FIG. 3 is a schematic diagram of a balanced-accelerating device in accordance with an embodiment of the invention. As shown in FIG. 3, the balanced-accelerating device 300 includes a first accelerator 310, a second accelerator 320, and a balancing device 330, in which the balancing device 330 includes a loading monitor 331 and a loading balancer 332.

The first accelerator 310 is configured to execute the first command queue CM1, the second command queue CM2, and the third command queue CM3. The second accelerator 320 is configured to execute the fourth command queue CM4, the fifth command queue CM5, and sixth command queue CM6. According to an embodiment of the invention, the first accelerator 310 may execute the first command queue CM1, the second command queue CM2, and the third command queue CM3, and the second accelerator 320 may execute the fourth command queue CM4, the fifth command queue CM5, and the sixth command queue CM6, which is merely illustrated herein, but not intended to be limited thereto.

It is noted that, in one embodiment, a first/second/third execution period is a time period when the first accelerator 310 executes commands of the first/second/third command queue CM1/CM2/CM3 during the predetermined period respectively, a fourth/fifth/sixth execution period is a time period when the second accelerator 320 executes commands of the fourth/fifth/sixth command queue CM4/CM5/CM6 during the predetermined period respectively, and a first/second/third/fourth/fifth/sixth execution duty cycle of the respective command queue CM1/CM2/CM3/CM4/CM5/CM6 is equal to the first/second/third/fourth/fifth/sixth execution period divided by the predetermined period respectively.

According to an embodiment of the invention, the first execution duty cycle of the first command queue CM1 is 20%, the second execution duty cycle of the second command queue CM2 is 30%, and the third execution duty cycle of the third command queue CM3 is 40%, such that the first duty cycle of the first accelerator 310 is 90%. According to an embodiment of the invention, the fourth execution duty cycle of the fourth command queue CM4 is 10%, the fifth execution duty cycle of the fifth command queue CM5 is 30%, and the sixth execution duty cycle of the sixth command queue CM6 is 10%, such that the second duty cycle of the second accelerator 320 is 50%.

According to an embodiment of the invention, when the loading balancer 332 has determined that the difference between the first duty cycle and the second duty cycle exceeds a threshold, the loading balancer 332 begins to balance the loadings of the first accelerator 310 and the second accelerator 320.

For example, the threshold is 30%, and the difference between the first duty cycle (i.e., 90%) and the second duty cycle (i.e., 50%) is 40%, which exceeds the threshold (30%). Therefore, the loading balancer 332 begins to balance the loadings of the first accelerator 310 and the second accelerator 320.

According to an embodiment of the invention, the loading balancer 332 may move the first command queue CM1 of the first accelerator 310, whose execution duty cycle is equal or approximately equal to a half of the difference between the first duty cycle and the second duty cycle, to the second accelerator 320. Since a half of the difference between the first duty cycle and the second duty cycle is 20%, the first command queue CM1 (i.e., 20%) is moved to the second accelerator 320 by the loading balancer 332 such that the first duty cycle and the second duty cycle are both 70%.

According to another embodiment of the invention, since the execution duty cycle of the command queue may not be too fortunate to be equal to a half of the difference, the loading balancer 332 moves the command queue with an execution duty cycle equal to a half of the difference between the first duty cycle and the second duty cycle plus a range of error. For example, it is assumed that the range of error is 5%, which indicates that the loading balancer 332 will move a command queue with an execution duty cycle from 15% to 25%.

According to another embodiment of the invention, when the loading balancer 332 determines that the difference between the first duty cycle and the second duty cycle exceeds a threshold, the loading balancer 332 may move the command queue, which is executed by the first accelerator 310, with the smallest execution duty cycle to the second accelerator 320. Since the command queue of the first accelerator 310 with the smallest execution duty cycle is the first command queue CM1, therefore, the loading balancer 332 moves the first command queue CM1 to the second accelerator 320.

According to yet another embodiment of the invention, when the loading balancer 332 determines that the difference between the first duty cycle and the second duty cycle exceeds a threshold, the loading balancer 332 may swap a command queue of the first accelerator 310 with a command queue of the second accelerator 320, in order to balance the first duty cycle and the second duty cycle.

Figure 4:
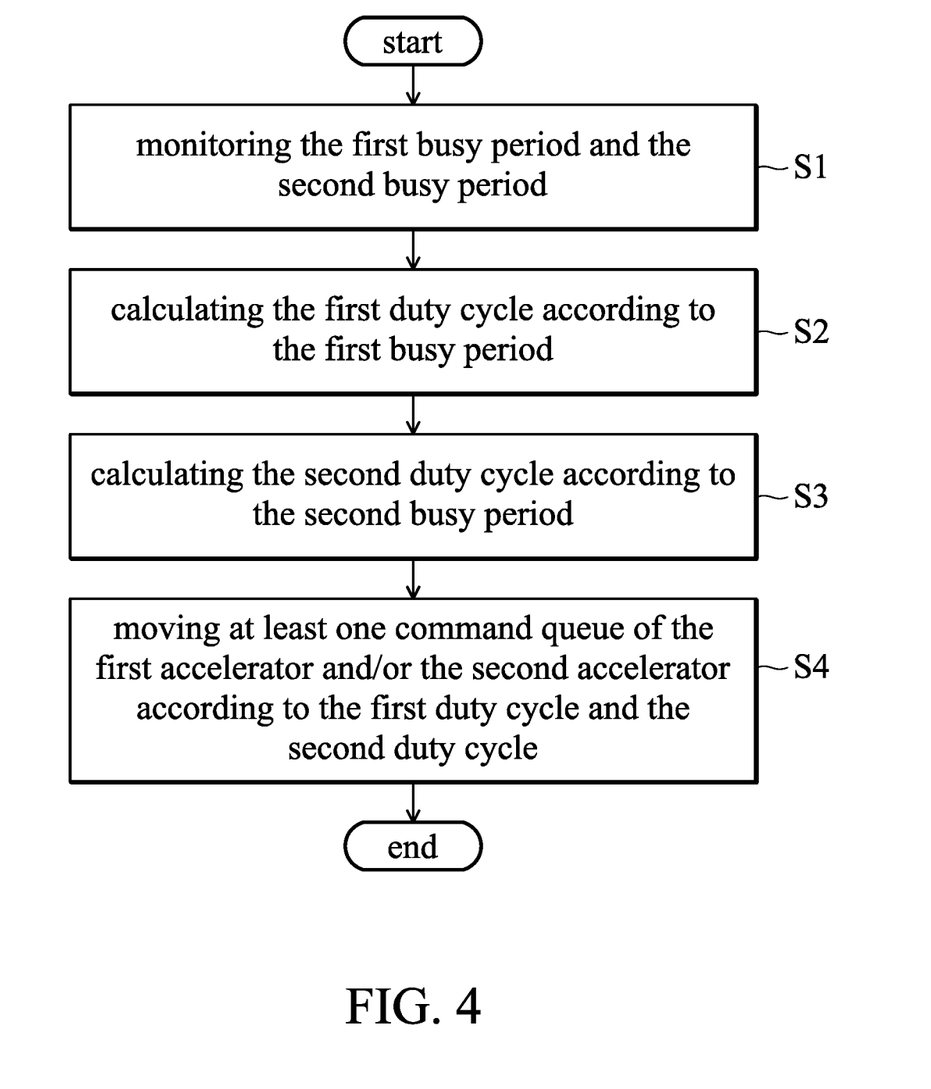
FIG. 4 is a flow chart of a balancing method in accordance with an embodiment of the invention.

FIG. 4 is a flow chart of a balancing method in accordance with an embodiment of the invention. The flow chart in FIG. 4 will be described with FIG. 1 for the simplicity of explanation. The loading monitor 130 monitors the first busy period of the first accelerator 110 and the second busy period of the second accelerator 120 (Step S1). In one embodiment, the first busy period is a time period when the first accelerator 110 is in a busy state during a predetermined period, and the second busy period is a time period when the second accelerator 120 is in the busy state during the predetermined period. The loading balancer 132 calculates the first duty cycle of the first accelerator 110 according to the first busy period (Step S2). In one embodiment, the first duty cycle is equal to the first busy period divided by the predetermined period. The loading balancer 132 calculates the second duty cycle according to the second busy period (Step S3). In one embodiment, the second duty cycle is equal to the second busy period divided by the predetermined period. The loading balancer 132 moves at least one command queue of the first accelerator 110 and/or the second accelerator 120 according to the first duty cycle and the second duty cycle (Step S4) to make the first duty cycle and the second duty cycle close to each other. In one embodiment, in step S4, the loading balancer 132 determining whether a difference between the first duty cycle and the second duty cycle exceeds a threshold. When the difference exceeds the threshold, the step S4 is executed.

Figure 5:
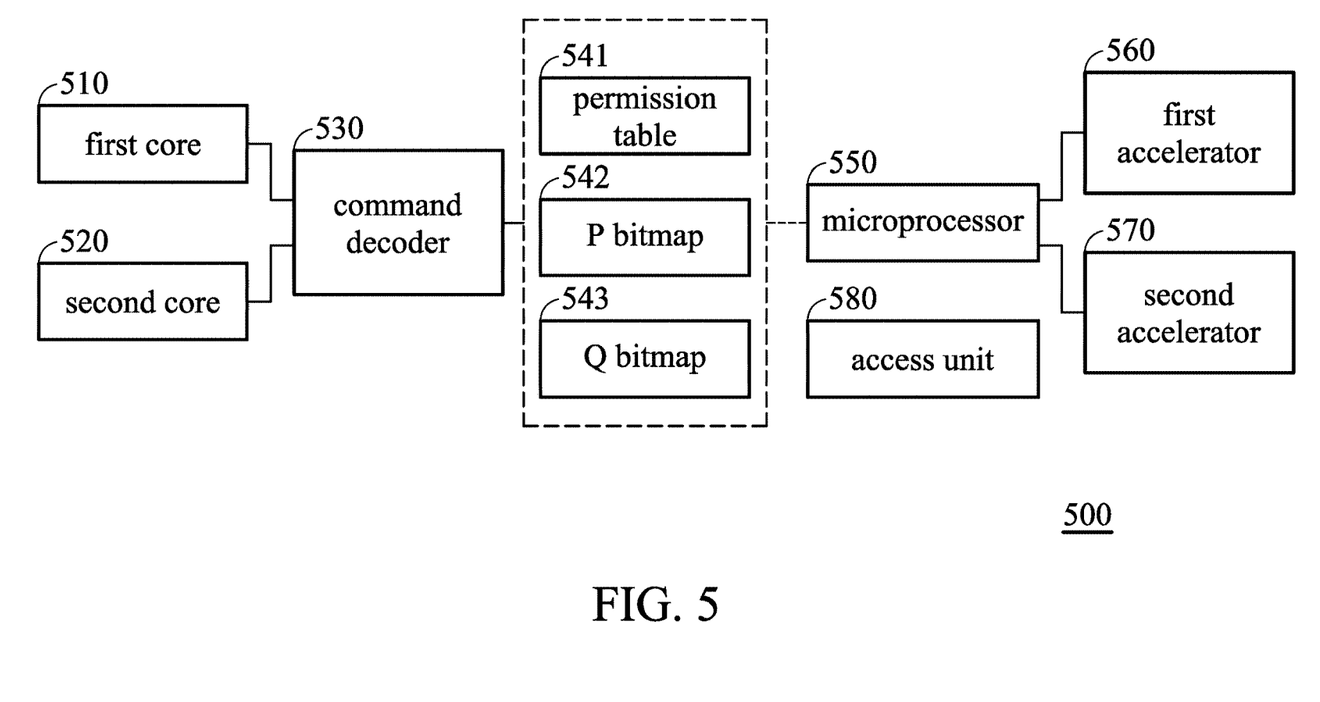
FIG. 5 is a block diagram of a system in accordance with an embodiment of the invention.

FIG. 5 is a block diagram of a system in accordance with an embodiment of the invention. As shown in FIG. 5, the system 500 includes a first core 510, a second core 520, a command decoder 530, a permission table 541, a P bitmap 542, a Q bitmap 543, a microprocessor 550, a first accelerator 560, a second accelerator 570, and an access unit 580.

The first core 510 and the second core 520 are the cores of the central processing unit, which are illustrated herein for explanation. According to other embodiment of the invention, the central processing unit may include any number of cores. According to an embodiment of the invention, when the first core 510 or the second core 520 accesses the command package stored in the host memory (not shown in FIG. 5), the accessed command package would be sent to the command decoder 530.

The command decoder 530 decodes the command package and the permission is checked in the permission table 541. When the command decoder 530 decodes the command package into several micro-operations, the decoded micro-operations are allocated in each command queue, and the P bitmap 542 and the Q bitmap 543 are modified at the same time. The microprocessor 550 assigns the corresponding command queues to the first accelerator 560 or the second accelerator 570 according to the P bitmap 542 and the Q bitmap 543.

According to other embodiment of the invention, the first accelerator 560 and the second accelerator 570 are illustrated for explanation. The system 500 may include any number of accelerators. The first accelerator 560 and the second accelerator 570 access the command packages in the corresponding command queues through the access unit 580, in which the command packages are stored in the host memory (not shown in FIG. 5).

According to an embodiment of the invention, when the loading balancer 132 in FIG. 1 is corresponding to the microprocessor 550 in FIG. 5, the command queues are stored in the SRAM of the microprocessor 550 in FIG. 5. According to another embodiment of the invention, when the loading balancer 132 in FIG. 1 is either the first core 510 or the second core 520 in FIG. 5, the command queues are stored in the host memory.

According to an embodiment of the invention, the controller 280 in FIG. 2 stores the predetermined period TD, the first busy period TB1, the second busy period TB2, the first execution period TE1, the second execution period TE2, the third execution period TE3, and the fourth execution period TE4 in the host memory.

Since the accelerators of the invention move the command packet or payload of the command queues, the loading balancer 132 in FIG. 1 may implemented by hardware. In addition, after the operation system transfers the task to the hardware accelerator, the operation system may not be interfered no matter how the loading balancer 132 is implemented. However, when the CPU is simultaneous multithreading, the CPU moves the commands of the threads. The operation system may be crashed when the commands are moved by pure hardware.

In addition, the method of the accelerator swapping the command queues to balance the loading as one of the embodiments described in FIG. 3 may not be executed in a complicated operation system, such as WINDOWS. Therefore, the balancing device and the balancing method are distinguished from the CPU simultaneous multithreading.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A balancing device, configured to balance a first duty cycle of a first accelerator and a second duty cycle of a second accelerator, comprising:
    a loading monitor, configured to monitor a first busy period of the first accelerator and a second busy period of the second accelerator; and
    a loading balancer, calculating the first duty cycle and the second duty cycle according to the first busy period and the second busy period and moving at least one command queue of the first accelerator and/or the second accelerator according to the first duty cycle and the second duty cycle to make the first duty cycle and the second duty cycle close to each other.

2. The balancing device of claim 1, wherein the first accelerator is configured to execute a first command queue and a second command queue, and the second accelerator is configured to execute a third command queue and a fourth command queue, wherein the loading monitor comprises:
- a clock counter, counting a predetermined period according to a clock;
- a first switch, wherein when a first busy bit is in a first logical state, the first switch provides the clock for a first execution clock, wherein when the first accelerator is in a busy state, the first busy bit is in the first logical state;
- a first busy counter, counting a first busy period of the first accelerator according to the first execution clock;
- a first execution counter, counting a first execution period of the first command queue and a second execution period of the second command queue according to the first execution clock;
- a second switch, wherein when a second busy bit is in the first logical state, the second switch provides the clock for a second execution clock, wherein when the second accelerator is in the busy state, the second busy bit is in the first logical state;
- a second busy counter, counting a second busy period of the second accelerator according to the second execution clock; and
- a second execution counter, counting a third execution period of the third command queue and a fourth execution period of the fourth command queue according to the second execution clock.

3. The balancing device of claim 2, wherein the loading monitor further comprises:
- a controller, storing the first busy period, the second busy period, the first execution period, the second execution period, the third execution period, and the fourth execution period in a memory, wherein when the clock counter has counted to the predetermined period, the controller resets the clock counter, the first busy counter, the first execution counter, the second busy counter, and the second execution counter to zero.

4. The balancing device of claim 2, wherein the first duty cycle is equal to the first busy period divided by the predetermined period, the second duty cycle is equal to the second busy period divided by the predetermined period, a first execution duty cycle is equal to the first execution period divided by the predetermined period, a second execution duty cycle is equal to the second execution period divided by the predetermined period, a third execution duty cycle is equal to the third execution period divided by the predetermined period, and a fourth execution duty cycle is equal to the fourth execution period divided by the predetermined period.

5. The balancing device of claim 1, wherein the first busy period is a time period when the first accelerator is in a busy state during a predetermined period, the second busy period is a time period when the second accelerator is in the busy state during the predetermined period, wherein:
the first duty cycle is equal to the first busy period divided by the predetermined period, the second duty cycle is equal to the second busy period divided by the predetermined period.

6. The balancing device of claim 1, wherein the first accelerator is configured to execute a first command queue and a second command queue, and the second accelerator is configured to execute a third command queue and a fourth command queue, wherein:
a first execution period is a time period when the first accelerator executes commands of the first command queue during a predetermined period, a second execution period is a time period when the first accelerator executes commands of the second command queue during the predetermined period, wherein:
a first execution duty cycle is equal to the first execution period divided by the predetermined period, a second execution duty cycle is equal to the second execution period divided by the predetermined period.

7. The balancing device of claim 6, wherein when the loading balancer determines that a difference between the first duty cycle and the second duty cycle exceeds a threshold, the loading balancer moves the second command queue to the second accelerator, wherein the second execution duty cycle does not exceed a half of the threshold with a range of error.

8. The balancing device of claim 6, wherein when the loading balancer determines that a difference between the first duty cycle and the second duty cycle exceeds a threshold, the loading balancer moves the second command queue to the second accelerator, wherein the second execution duty cycle is less than the first execution duty cycle.

9. The balancing device of claim 6, wherein when the loading balancer determines that a difference between the first duty cycle and the second duty cycle exceeds a threshold, the loading balancer moves the first command queue or the second command queue to the second accelerator and moves the third command queue or the fourth command queue to the first accelerator.

10. The balancing device of claim 1, wherein the balancing device is coupled between a central processing unit and the first and second accelerators.

11. A balancing method, configured to balance a first duty cycle of a first accelerator and a second duty cycle of a second accelerator, comprising:
- monitoring a first busy period of the first accelerator and a second busy period of the second accelerator;
- calculating the first duty cycle according to the first busy period;
- calculating the second duty cycle according to the second busy period; and
- moving at least one command queue of the first accelerator and/or the second accelerator according to the first duty cycle and the second duty cycle to make the first duty cycle and the second duty cycle close to each other.

12. The balancing method of claim 11, wherein the first accelerator is configured to execute a first command queue and a second command queue, and the second accelerator is configured to execute a third command queue and a fourth command queue, wherein the step of monitoring the first busy period and the second busy period further comprises:
- counting a predetermined period according to a clock;
- when the first accelerator is in a busy state, providing the clock for a first execution clock;
- counting a first busy period of the first accelerator according to the first execution clock;
- counting a first execution period of the first command queue and a second execution period of the second command queue according to the first execution clock;
- when the second accelerator is in the busy state, providing the clock for a second execution clock;
- counting a second busy period of the second accelerator according to the second execution clock; and
- counting a third execution period of the third command queue and a fourth execution period of the fourth command queue according to the second execution clock.

13. The balancing method of claim 12, wherein the step of monitoring the first busy period and the second busy period further comprises:
    storing the first busy period, the second busy period, the first execution period, the second execution period, the third execution period, and the fourth execution period in a memory.

14. The balancing method of claim 12, wherein the first duty cycle is equal to the first busy period divided by the predetermined period, the second duty cycle is equal to the second busy period divided by the predetermined period, a first execution duty cycle is equal to the first execution period divided by the predetermined period, a second execution duty cycle is equal to the second execution period divided by the predetermined period, a third execution duty cycle is equal to the third execution period divided by the predetermined period, and a fourth execution duty cycle is equal to the fourth execution period divided by the predetermined period.

15. The balancing method of claim 11, wherein the first busy period is a time period when the first accelerator is in a busy state during a predetermined period, the second busy period is a time period when the second accelerator is in the busy state during the predetermined period, wherein:
    the first duty cycle is equal to the first busy period divided by the predetermined period, the second duty cycle is equal to the second busy period divided by the predetermined period.

16. The balancing method of claim 11, wherein the first accelerator is configured to execute a first command queue and a second command queue, and the second accelerator is configured to execute a third command queue and a fourth command queue, wherein:
    a first execution period is a time period when the first accelerator executes commands of the first command queue during a predetermined period, a second execution period is a time period when the first accelerator executes commands of the second command queue during the predetermined period, wherein:
    a first execution duty cycle is equal to the first execution period divided by the predetermined period, a second execution duty cycle is equal to the second execution period divided by the predetermined period.

17. The balancing method of claim 16, wherein the step of moving at least one command queue of the first accelerator and/or the second accelerator according to the first duty cycle and the second duty cycle further comprises:
    determining whether a difference between the first duty cycle and the second duty cycle exceeds a threshold; and
    when the difference exceeds the threshold, moving the second command queue to the second accelerator, wherein the second execution duty cycle does not exceed a half of the difference with a range of error.

18. The balancing method of claim 16, wherein the step of moving at least one command queue of the first accelerator and/or the second accelerator according to the first duty cycle and the second duty cycle further comprises:
    determining whether a difference between the first duty cycle and the second duty cycle exceeds a threshold; and
    when the difference exceeds the threshold, moving the second command queue to the second accelerator, wherein the second execution duty cycle is less than the first duty cycle.

19. The balancing method of claim 16, wherein the step of moving at least one command queue of the first accelerator and/or the second accelerator according to the first duty cycle and the second duty cycle further comprises:
    determining whether a difference between the first duty cycle and the second duty cycle exceeds a threshold; and
    when the difference exceeds the threshold, moving the first command queue or the second command queue to the second accelerator, and moving the third command queue or the fourth command queue to the first accelerator.

20. The balancing method of claim 11, wherein the step of moving at least one command queue of the first accelerator and/or the second accelerator according to the first duty cycle and the second duty cycle further comprises:
    determining whether a difference between the first duty cycle and the second duty cycle exceeds a threshold; and
    when the difference exceeds the threshold, executing the step of moving at least one command queue of the first accelerator and/or the second accelerator.

* * * * *